(12) United States Patent
Perten et al.

(10) Patent No.: US 8,704,650 B1
(45) Date of Patent: *Apr. 22, 2014

(54) TRACTOR-TRAILER COUPLING DETECTION

(75) Inventors: Herbert Perten, Suffern, NY (US); Robert Schicke, Denville, NJ (US)

(73) Assignee: Startrak Information Technologies, LLC, Fort Lee, NJ (US)

(*) Notice: Subject to any disclaimer, the term of this patent is extended or adjusted under 35 U.S.C. 154(b) by 382 days.

This patent is subject to a terminal disclaimer.

(21) Appl. No.: 12/987,204

(22) Filed: Jan. 10, 2011

Related U.S. Application Data

(63) Continuation of application No. 12/054,380, filed on Mar. 24, 2008, now Pat. No. 7,911,330.

(60) Provisional application No. 60/896,491, filed on Mar. 22, 2007, provisional application No. 60/908,467, filed on Mar. 28, 2007, provisional application No. 60/908,588, filed on Mar. 28, 2007.

(51) Int. Cl.
*G08B 21/00* (2006.01)
*B60R 25/10* (2013.01)
*G08B 29/00* (2006.01)

(52) U.S. Cl.
USPC ......... 340/431; 340/428; 340/509; 340/510; 340/514; 340/687; 340/538; 307/9.1; 280/DIG. 14; 303/1

(58) Field of Classification Search
USPC ....................................... 340/531
See application file for complete search history.

(56) References Cited

U.S. PATENT DOCUMENTS

| 6,130,487 | A  | * | 10/2000 | Bertalan et al. | 307/9.1 |
| 6,466,028 | B1 | * | 10/2002 | Coppinger et al. | 324/504 |
| 7,911,330 | B1 | * | 3/2011  | Perten et al. | 340/431 |
| 2005/0017856 | A1 | * | 1/2005 | Peterson | 340/431 |
| 2006/0261935 | A1 | * | 11/2006 | McAden | 340/431 |

* cited by examiner

*Primary Examiner* — Donnie Crosland
(74) *Attorney, Agent, or Firm* — Drinker Biddle & Reath LLP

(57) ABSTRACT

To test whether a trailer is coupled to a tractor when the tractor ignition switch is off, a test switch in the trailer connects a high-impedance power source in a trailer to a line carrying energy from the tractor ignition switch to the trailer's electrical load, and measures the voltage at the line. A high voltage indicates a connection only to the electrical load in the trailer and thus a decouple. A low voltage indicates a measurement of the electrical loads in both trailer and tractor and hence a coupling.

13 Claims, 4 Drawing Sheets

TRACTOR-TRAILER COUPLING DETECTION

RELATED APPLICATIONS

This application claims the benefit of U.S. Application Ser. No. 60/896,491 filed 22 Mar. 2007, U.S. Application Ser. No. 60/908,467 filed 28 Mar. 2007, and U.S. Application Ser. No. 60/908,588 filed 28 Mar. 2007. This application is a continuation of U.S. application Ser. No. 12/054,380 filed 24 Mar. 2008, now U.S. Pat. No. 7,911,330 issued 22 Mar. 2011. The contents of these applications are hereby incorporated herein as if fully recited herein.

FIELD OF THE INVENTION

This invention relates to trailer-mounted telematics system, and particularly to telematics system for accurately detecting when a trailer is or is not coupled to a tractor.

BACKGROUND OF THE INVENTION

In present systems, when a tractor connects to a trailer, the operator completes an electrical connection through a cable between the two units to provide electrical power to the trailer for operation of the lights and the anti-lock braking system. Various devices serve to indicate when the connection is broken. However, when the tractor's ignition is switched off while still connected to a trailer, such as during a stop en route for the driver to sleep or eat the trailer has no way of determining whether the tractor has in fact been decoupled or if the tractor has merely been shut off.

An object of this invention is to overcome this and other problems in the system.

SUMMARY OF EMBODIMENTS OF THE INVENTION

According to an embodiment of the invention, when the tractor ignition switch is off, a test switch in the trailer connects a high-impedance power source in a trailer to a line carrying energy from the tractor ignition switch to the trailer's electrical load, and a meter measures the voltage at the line, so that one voltage denotes only the electrical load in the trailer and thus a decouple, and another voltage denotes the electrical loads in both trailer and tractor and hence a coupling.

The various features of novelty characterizing the invention are pointed out in the claims. Other objects and advantages of the invention will become evident from the following detailed description when read in light of the accompanying drawings.

DETAILED DESCRIPTION OF PREFERRED EMBODIMENTS

Figure 1:
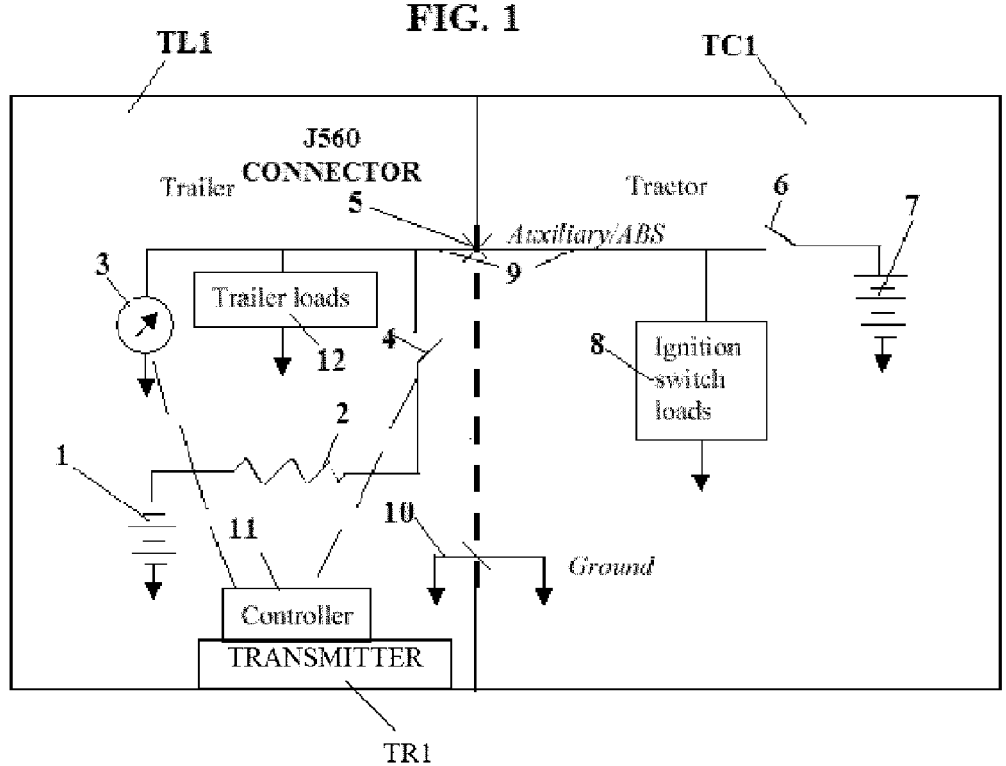
FIG. 1 is a schematic diagram illustrating an embodiment of the invention.

In the embodiment of FIG. 1, a tractor TC1 and a trailer TL1 are electrically connected by means of a multi-pin "J560" connector 5 through an auxiliary/ABS (antilock brake system) line 9 and a ground line 10. Other circuits within this multi-pin connector 5 carry other signals, for example to control trailer lights. When an ignition switch 6 within the tractor TC1 is closed, battery voltage from a battery 7 appears at ignition switch loads 8 and other electrical loads within the tractor TC1. The closed ignition switch 6 and a pin within the multi-pin connector 5 also place the voltage at the battery 7 onto the trailer's electrical loads 12 (primarily an antilock brake module). A voltage-measuring device 3 in the trailer TL1 senses the voltage present at the line 9 relative to ground 10.

When the tractor TC1 is running and is connected to the trailer TL1, ignition switch 6 is closed and voltage on the battery 7 appears at the signal line 9. Circuitry in 3 detects the voltage on battery 7 and informs a controller 11 mounted within the trailer TL1 that it has been connected to the tractor TC1. Should the tractor TC1 become disconnected from the trailer TL1, the voltage on 9 will vanish, and the trailer sensing system will correctly infer that it is no longer connected to a tractor.

At installation time, the trailer system is calibrated to the electrical loads present. The trailer TL1 is left unconnected to any tractor, and a switch 4 is closed. This allows current to pass through resistor 2 to the trailer loads 12 on the Auxiliary/ABS line 9. The voltage on the line is read by means of meter 3, which may alternatively be an analog-to-digital converter. Controller 11 stores the value obtained. Resistor 2 is selected to give a small voltage drop during this calibration phase.

When the tractor's ignition switch 6 is opened while the tractor TC1 is still connected to the trailer TL1, voltage is no longer present at line 9. The controller 11 detects the absence of the voltage at line 9 by sensing the voltage from the meter 3, and now determines if this loss of voltage is due to a disconnect between tractor TC1 and trailer TL1, or to the ignition switch 6 in the tractor TC1 being switched off. To do this, the controller 11 responds to the absence of signal at meter 3 and closes the switch 4, thereby causing a test current to flow through resistor 2 to the line 9 and to the meter 3. The meter 3 again measures the voltage on the line 9. Should this voltage be a value stored during the calibration phase, the controller 11 correctly infers that there has been a true disconnect of the trailer TL1 from the tractor TC1.

Figure 2:
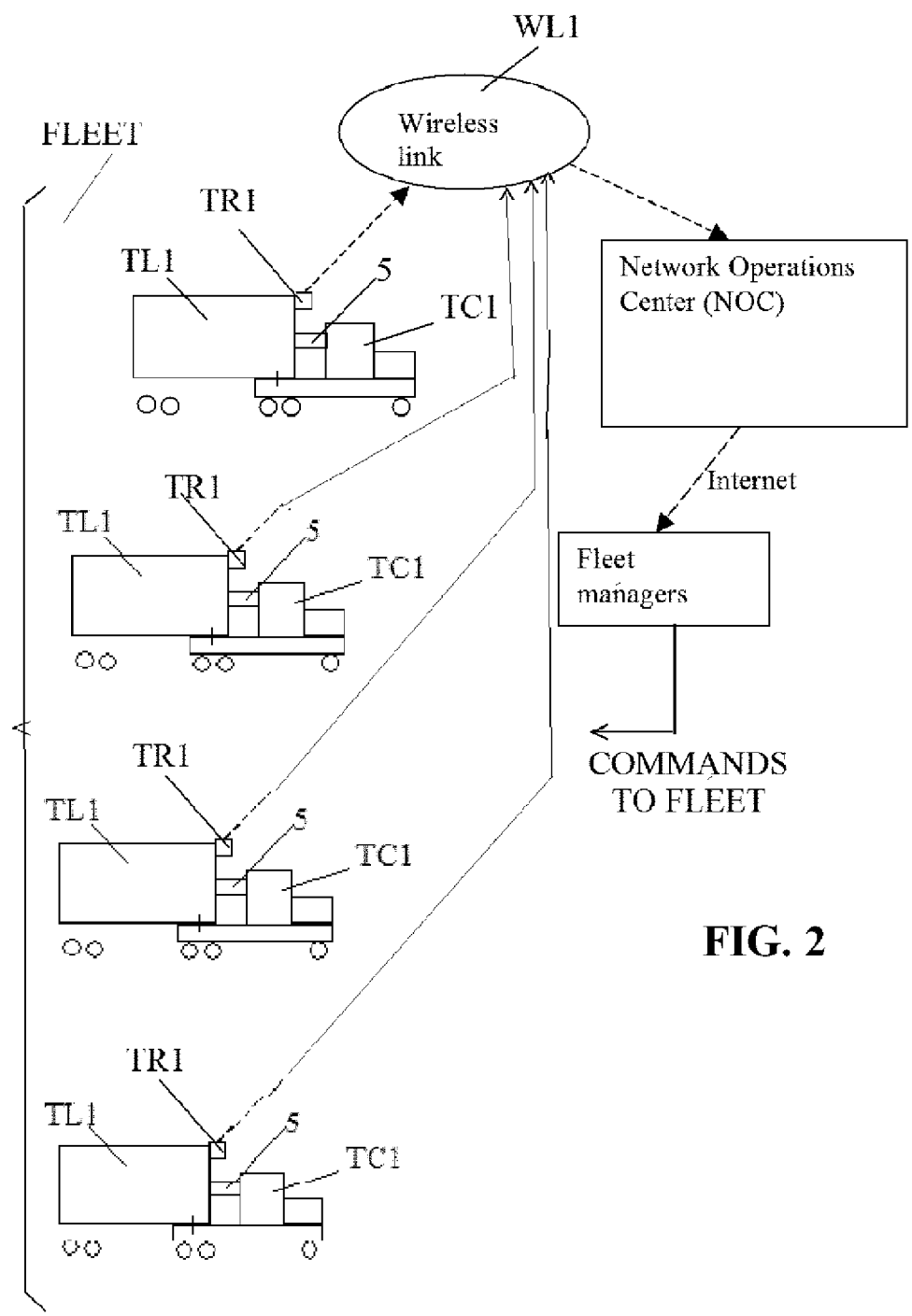
FIG. 2 is a schematic diagram illustrating another embodiment of the invention incorporating the embodiment of FIG. 1.

Should the tractor TC1 still be connected to the trailer TL1, then the other electrical loads 8 within the tractor TC1 will draw current at a level higher than was measured during calibration. The voltage measured at meter 3 will fall to a value below the calibration value. The controller 11 will correctly interpret this as an ignition switch turn-off rather than a tractor disconnect. The controller 11 operates a transmitter TR1 that transmits the information concerning connect or disconnect. According to one embodiment of the invention, the transmitter TR1 is part of the controller 11. According to another embodiment the transmitter TR1 is external to the controller. According to another embodiment the transmitter TR1, while external to the controller 11, still remains part of the controller FIG. 2 illustrates a trailer fleet of a number of tractor/trailer combinations, wherein each tractor is designated TC1 and each trailer TR1, and wherein each tractor and each trailer includes the respective circuitry shown in FIG. 1. In FIG. 1, the controller 11 includes the transmitter, shown in FIG. 2 as TR1, that transmits the connect or disconnect information from each tractor/trailer combination to a wireless link WL1 that transfers the data to a Network Operations Center NOC. An internet link conveys the data to Fleet Managers FM1 that use the facts to help manage the fleet.

Figure 3:
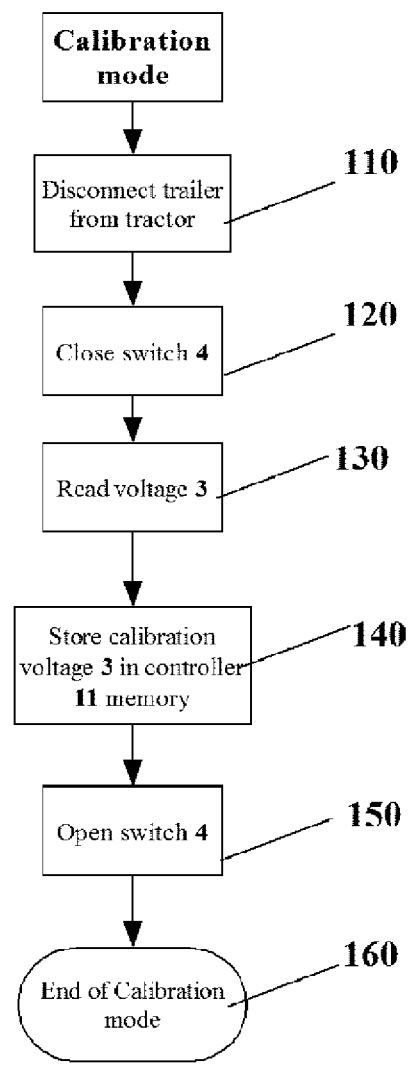
FIG. 3 is a flow chart illustrating the operation embodying an aspect of the invention.

FIG. 3 is a flow chart illustrating the operation of the controller 11 during calibration. Here, the calibration starts with step 110 by unhooking the trailer TL1 from the tractor TC1. Step 120 follows by closing switch 4 and reading the voltage with meter 3 in step 130. In step 140 a memory in the controller 11 stores the voltage of meter 3, and in step 150 the switch 4 is opened to end the calibration as shown at 160.

Figure 4:
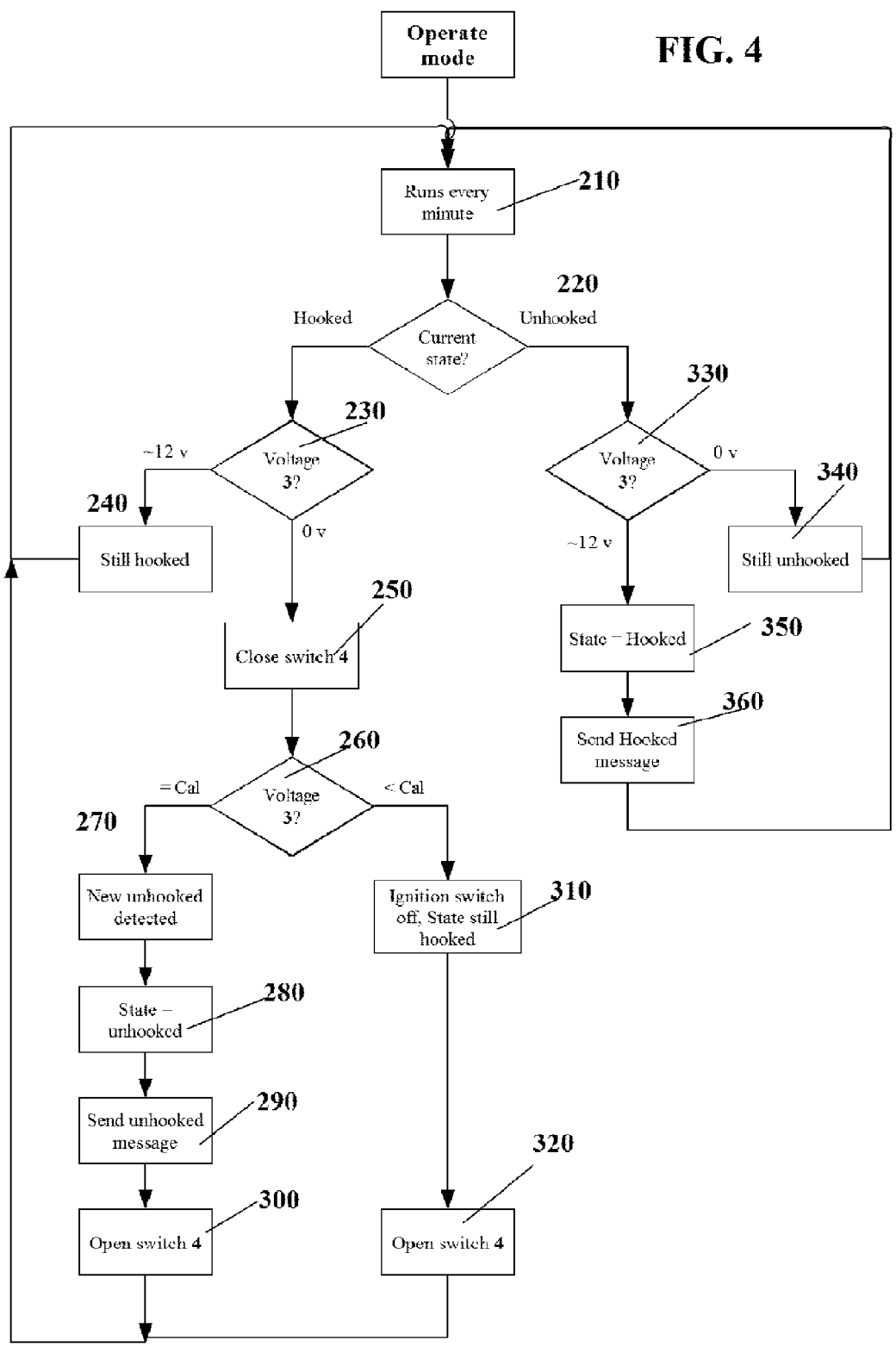
FIG. 4 is a flow chart illustrating the operation embodying another aspect of the invention.

FIG. 4 is a flow chart illustrating the operation of the controller 11 during normal operation. At the outset the controller 11 stores the hooked or unhooked (i.e. coupled or uncoupled) state that was previously determined. In the absence of an initial current coupling state stored in the controller 11, the latter signals a default state of "unhooked", i.e. uncoupled. In step 210 a clock in the controller 11 initiates a test signal periodically, such as every minute to actuate a determination of the current (i.e. existing) state. The controller then compares the current state with the stored state as it pre-existed just prior to each periodic signal. As indicated, the stored coupling state may be the default state of "unhooked" or uncoupled.

If controller 11 has stored an indication that the trailer was previously hooked, step 230 checks the voltage at meter 3. If the voltage at step 230 is approximately 12 volts this indicates in step 240 that the trailer TL1 is still hooked. The controller 11 then stores the hooked condition or state and transmits a signal to continue with periodic testing at step 210. If the voltage at meter 3 in step 230 is approximately 0 volts, the controller 11 executes step 250 and closes switch 4. The controller 11, at step 260, checks the voltage at meter 3. At step 270 if the voltage is equal to the calibration voltage, the controller has detected an unhook indicating that the state is unhooked at step 280. At step 290 the transmitter in the controller 11 sends an unhooked message to the fleet managers via the wireless link WL1 and the center NOC. In step 300 the controller 11 opens the switch 4 and signals to continue with step 210. The controller 11 stores this unhook condition.

In step 260 if the voltage at meter 3 is less than the calibration voltage, step 310 indicates that the ignition switch 6 is off but the trailer is hooked. The controller 11 opens the switch 4 in step 320 and returns to step 210. The controller 11 stores the hooked state.

In step 210 a clock in the controller 11 continues to actuate a determination of the current state in step 220. If the controller shows a state wherein the trailer is unhooked, step 330 checks the voltage at meter 3. If the voltage is approximately 0 volts this indicates in step 340 that the trailer TL1 is still unhooked. The controller 11 then transmits a signal to continue with testing at step 210. The controller stores this new unhooked state. If the voltage at meter 3 in step 330 is approximately 12 volts, the controller at step 350 recognizes that the status in hooked. At step 360 the transmitter in the controller 11 sends a hooked message to the fleet managers via the wireless link WL1 and the center NOC and signals the controller to continue at step 210. The controller 11 the stores the newly hooked state.

The controller 11 thus sends a state message only when the current state changes despite the periodic state tests. This limits the bandwidth and transmission time used by the system in reporting changes.

The controller 11 is biased into the unhooked condition because typically the controller starts its operation as the trailer TL1 is coupled to the tractor TC1. Thus, the coupling of trailer TL1 to tractor TC1 results in a change at step 330 to approximately 12 volts that initiates step 350 and causes the controller 11 to signal that the trailer has become coupled to the tractor.

The embodiments of the invention allow a trailer-mounted telematics system to accurately detect when it is or is not coupled to a tractor. Upon change of coupling state, the system can wirelessly send a message to its fleet manager, who can take appropriate action. When a tractor connects to a trailer, the operator completes the electrical connection between the two units by means of a 7-signal cable specified by SAE J560. This allows the tractor to provide electrical power to the trailer for operation of the lights and the anti-lock braking system. One way a trailer-mounted device can detect that it is coupled to a tractor is to monitor the electrical status of the Auxiliary and ABS line (pin 7). This line is typically connected to the load side of the tractor's ignition switch, and therefore is at ~12 v when the tractor is running. If the trailer-mounted device senses voltage at this pin, it serves as an indication that it has been connected to a tractor; absence of voltage implies that the connection has been broken.

The embodiments of the invention overcome an anomaly that may exist when the tractor's ignition is switched off while still connected to a trailer. This may occur due to any number of reasons, among them stopping en route for the driver to sleep or eat. The embodiments of the invention overcome the difficulty of merely monitoring the voltage of the Auxiliary and ABS signal when the trailer has no way of determining whether the tractor has in fact been decoupled or if the tractor has merely been shut off.

The embodiments of the invention surmount this problem by adding the additional circuit in the trailer-mounted device. A nominal 12-volt supply 1 from the trailer TL1 is temporarily connected to the Auxiliary and ABS line 9 through the current limiting resistor 2. This resistor 2 is sized to allow a small voltage drop when driving just trailer-mounted loads, but a larger voltage drop when attempting to drive the tractor loads on the switched circuit of the tractor's ignition switch 7. During installation, the voltage drop due to the trailer alone is measured and recorded. Thus, if there is a tractor connected, the voltage at the Auxiliary and ABS line 9 will fall to a level below that obtained during calibration; if a tractor is not connected, the voltage will be at the calibration level. Because of the limited current available, none of the tractor loads are energized, and the action of the tractor's ignition switch is not compromised. The embodiments of the invention limit the bandwidth and transmission time used.

The embodiments of the invention prevent a remote monitoring system using telematics from transmitting false disconnect/reconnect sequences and confusing a fleet operator.

While embodiments of the invention have been described, it will be evident that the invention may be embodied otherwise.

What is claimed is:

1. A system comprising:
   a tractor having an ignition switch and an electrical load,
   a trailer having an electrical load,
   an electrical line between the tractor and the trailer and connecting the electrical load on the trailer with the electrical load in the tractor when the tractor is coupled to the trailer,
   a power source in the tractor to power the electrical load in the tractor through the ignition switch and connected to the line for powering electrical load in the trailer when the trailer is coupled to the tractor,
   a power arrangement in the trailer and having a given impedance,
   a test circuit including a test switch between the impedance and said line, said switch when on connecting said power source to said line, said test circuit, when the test switch is on, being responsive to when the power arrangement powers only the electrical load in the trailer and when the power arrangement powers both the electrical load in the trailer and the electrical load in the tractor.

2. A system as in claim 1, wherein said test circuit, when the test switch is on, is responsive to when the power arrangement powers only the electrical load in the trailer and when the power arrangement powers both the electrical load in the trailer and the electrical load in the tractor, when the ignition switch is off.

3. A system as in claim 1, wherein said test circuit includes a transmitter, a wireless link responsive to said transmitter for receiving data from said transmitter, and a management system responsive to said wireless link and for sending commands.

4. A system as in claim 3, wherein said management system includes means coupled to said test switch to turn said test switch on and off.

5. A system as in claim 1, wherein said test circuit includes a metering arrangement responsive to electrical readings in said electrical loads.

6. A system as in claim 1, wherein said test circuit includes a meter across said loads and in said trailer, said transmitter being responsive to said meter.

7. A fleet of vehicles, comprising:
a plurality of tractors each having an ignition switch and an electrical load,
a plurality of trailers each having an electrical load,
a plurality of electrical lines each for connection between one of said tractors and one of the trailers and connecting the electrical load on the one of the trailers with the electrical load in the one of the tractors when the one of the tractors is coupled to the one of the trailers,
a power source in each of the tractors to power the electrical load in the tractor through the ignition switch and connected to the one of the electrical lines for powering the electrical load in the one of the trailers when the one of the trailers is coupled to the one of the tractors,
a power arrangement in each of the trailers and having a given impedance and connected to the one of said lines,
a test circuit in each of the trailers including a test switch between the impedance and said one of said lines, said switch when on connecting said power source to said one of said lines,
said test circuit, when the test switch is on, being responsive to when the power arrangement powers only the electrical load in the trailer and when the power arrangement powers both the electrical load in the trailer and the electrical load in the tractor,
each of said test circuits including a transmitter,
a wireless link responsive to each of said transmitters for receiving data from said transmitter,
a management system responsive to said wireless link and for sending commands.

8. A system as in claim 7, wherein in each of said test circuits, when the test switch is on, is responsive to when the power arrangement powers only the electrical load in the one of said trailers and when the power arrangement powers both the electrical load in the one of the trailers and the electrical load in the one of the tractors, when the ignition switch on the one of said tractors is off.

9. A system as in claim 7, wherein said management system includes means coupled to said test switches to turn selected ones of said test switches on and off.

10. A system as in claim 7, wherein each of said test circuits includes a metering arrangement responsive to electrical readings in said electrical loads.

11. A system as in claim 7, wherein each of said test circuits includes a meter across said loads and in said trailers, said transmitter being responsive to said meter.

12. In a tractor-trailer arrangement having an electrical line connecting an electrical load in the tractor with an electrical load in the trailer through a trailer hookup, a method, comprising:
connecting a power source in the trailer through an impedance to said electrical line in the trailer while the trailer is coupled to the tractor and while the trailer is uncoupled from the tractor;
storing a prevailing electrical condition at the electrical line while the trailer is one of coupled and decoupled, as a default condition;
intermittently connecting the power source in the trailer through the impedance to said electrical line in the trailer and measuring the prevailing electrical condition at the electrical line;
comparing an intermittently measured prevailing condition with the stored default condition as an indication that the trailer is coupled to or uncoupled from the tractor.

13. A method as in claim 12, wherein said indication is transmitted to a management arrangement.

* * * * *